US008532578B2

(12) United States Patent
Mähönen et al.

(10) Patent No.: US 8,532,578 B2
(45) Date of Patent: Sep. 10, 2013

(54) METHOD AND SYSTEM FOR SPECTRUM MANAGEMENT IN COMMUNICATION NETWORKS, CORRESPONDING NETWORK AND COMPUTER PROGRAM PRODUCT

(75) Inventors: Petri Mähönen, Aachen (DE); Matthias Wellens, Aachen (DE); Marina Petrova, Aachen (DE); Diego Melpignano, Muggiò (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 773 days.

(21) Appl. No.: 12/725,977

(22) Filed: Mar. 17, 2010

(65) Prior Publication Data

US 2010/0240316 A1   Sep. 23, 2010

(30) Foreign Application Priority Data

Mar. 17, 2009   (IT) .............................. TO2009A0203

(51) Int. Cl.
    *H04B 17/00*   (2006.01)
(52) U.S. Cl.
    USPC ..................................... 455/67.11; 455/63.1
(58) Field of Classification Search
    USPC .............................. 455/67.11, 41.2, 63.1, 423
    See application file for complete search history.

(56) References Cited

U.S. PATENT DOCUMENTS

| 2007/0053410 A1 | 3/2007 | Mahonen et al. ............. 375/130 |
| 2008/0076450 A1* | 3/2008 | Nanda et al. ................ 455/456.1 |
| 2008/0261639 A1 | 10/2008 | Sun et al. ...................... 455/515 |

FOREIGN PATENT DOCUMENTS

| WO | 2006/020405 | 2/2006 |
| WO | 2007/096819 | 8/2007 |
| WO | 2008/039872 | 4/2008 |

OTHER PUBLICATIONS

Intel, White Paper Ultra-Wideband (UWB Technology): Enabling high-speed wireless personal area networks, 2005, Intel, 8 pages.*

* cited by examiner

*Primary Examiner* — Lewis West
(74) *Attorney, Agent, or Firm* — Allen, Dyer, Doppelt, Milbrath & Gilchrist, P.A.

(57) ABSTRACT

Spectrum usage in a radio cognitive transmission system may be monitored in a distributed manner in space and time through a first set of monitoring apparatuses and a second set of monitoring apparatuses. The first set of monitoring apparatuses may be associated to apparatuses, such as base stations, having a monitoring precision level, for example, linked to the spectrum sampling frequency, greater with respect to the monitoring precision of the monitoring apparatus of the second set. The later may be suitable to be represented by a low-cost "sniffer" associated to consumer electronics devices.

38 Claims, 4 Drawing Sheets

METHOD AND SYSTEM FOR SPECTRUM MANAGEMENT IN COMMUNICATION NETWORKS, CORRESPONDING NETWORK AND COMPUTER PROGRAM PRODUCT

FIELD OF THE INVENTION

The present description refers to techniques for dynamically assessing the frequency spectrum in wireless networks. Such techniques are used in a wide range of applications and, in particular, in "cognitive radio" applications.

BACKGROUND OF THE INVENTION

The use of the frequency spectrum by various radio communication services was traditionally regulated in a static manner by the entities delegated with such regulatory function. However, this mode of operating leads to many frequency bands being under-occupied in time and space.

Research in the "cognitive radio" sector aims at defining a structure capable of allowing devices to temporarily and dynamically use such frequency bands without harming the authorized users or "primary users." A cognitive radio is capable of analyzing the frequency spectrum and using the bands currently not used by their assignees (primary users). The approach of systems employing cognitive radios is that of generating—at the user level—an awareness of the state of the spectrum in such a manner to allow the radio receivers to move toward those bands that are vacant in that they are not currently used by the primary users.

Currently, the available literature concerning dynamic spectrum assessment regards methods in which a cognitive radio: i) independently carries out measurements on the spectrum, for example, detecting energy or other characteristics, and executes an algorithm to decide whether it can use some frequency bands to communicate; ii) contacts some server responsible for the spectrum management policy, capable of providing information regarding the availability of the spectrum alongside other information regarding management policy of the same; and iii) performs cooperative detection, where various cognitive radios exchange through any communication implementation, spectrum availability information.

Such approaches may reveal various drawbacks. For example, in the first approach considered previously, the information is of the local type, i.e. limited to the zone where the terminal is located, and there are widely known problems regarding hidden terminals and failed detections. Other methods use the presence of a centralized server, and they are based on a sort of spectrum micro-level "auction" and use an extensive information exchange between the various entities. The last mentioned method is also limited by the fact that the terminals participate in a cooperative manner. Furthermore, in all cases, the cognitive radios may include a spectrum detection capacity and/or may use the construction of an (generally expensive) additional infrastructure for spectrum detection and for forwarding the respective information.

SUMMARY OF THE INVENTION

An object is to provide a technique for developing a low cost large-scale spectrum monitoring network capable of producing high precision models of spectrum usage.

Another aspect regards a corresponding system, a network including such system, as well as a computer program product, loadable in the memory of at least one computer and including software code portions for implementing the abovementioned method. As used herein, reference to such computer program product is intended to be equivalent to the reference to a computer readable medium carrying instructions for the control of the processing system to coordinate the implementation of the method disclosed herein. Reference to "at least one computer" is obviously intended to highlight the possibility that the present disclosure be implemented in modular and/or distributed form.

BRIEF DESCRIPTION OF THE DRAWINGS

Now, the invention may be described, purely for exemplary and non-limiting purposes, with reference to the attached representations, wherein.

DETAILED DESCRIPTION OF THE PREFERRED EMBODIMENTS

Illustrated in the following description are various specific details aimed at an in-depth understanding of the embodiments. The embodiments may be obtained without one or more specific details, or through other methods, components, materials etc. In other cases, known structures, materials or operations are not shown or described in detail to avoid obscuring the various aspects of the embodiments.

Reference to "an embodiment" in this description indicates that a particular configuration, structure or characteristic described regarding the embodiment is included in at least one embodiment. Hence, expressions such as "in an embodiment", possibly present in various parts of this description do not necessarily refer to the same embodiment. Furthermore, particular configurations, structures or characteristics may be combined in any suitable manner in one or more embodiments. References herein are used for facilitating the reader and thus they do not define the scope of protection or the range of the embodiments.

Figure 1:
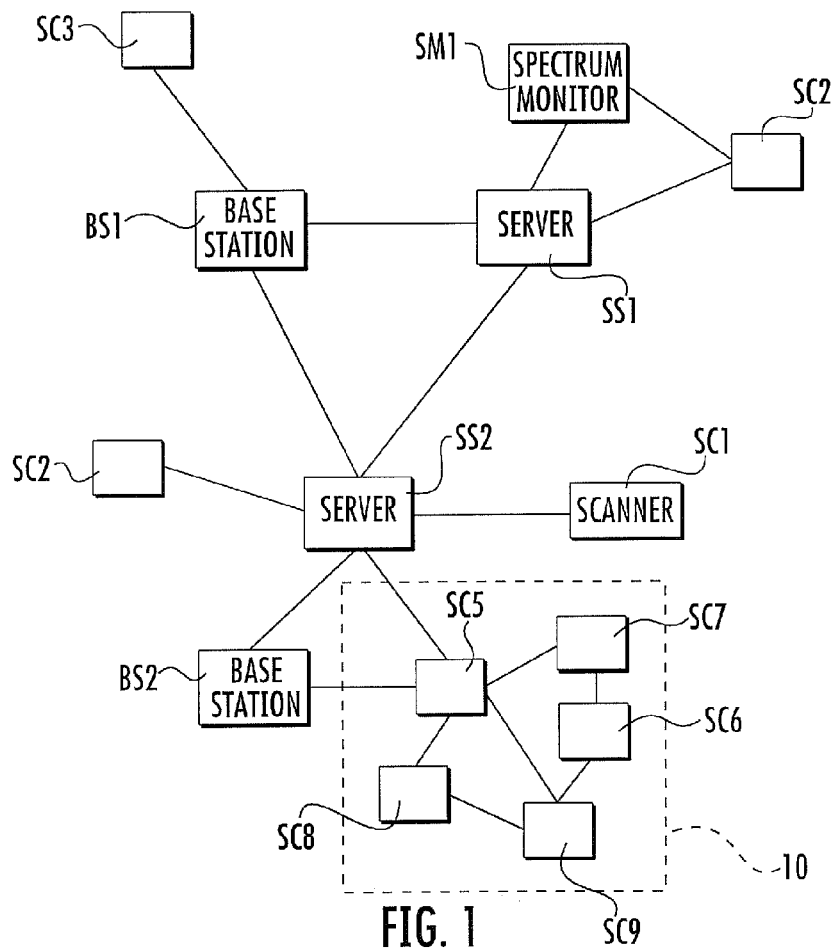
FIG. 1 shows the architecture of a system, according to the present invention.

In the approach disclosed herein, monitoring the spectrum is based on a spectral monitoring of the distributed type, which uses—to provide the mapping of the spectrum capacity—both devices having "high" precision and reliability and devices having "low" precision and reliability. An example of a wireless network in which distributed spectrum monitoring is performed is shown in FIG. 1.

In this figure, various base stations, indicated with references BS1 and BS2, belonging to a given operator, and a spectrum monitor, indicated with reference SM1, belonging to a regulator or operator, provide high precision information regarding the status of the spectrum. The information provided by these sources can be considered reliable and precise given that these devices BS and SM are controlled by trusted entities and are part of the commercial configuration made available for the users.

The marginal cost of including a normal base station BS in an available configuration is extremely high, while, for example, the marginal cost of including a high precision energy detector or a receiver for detecting the characteristics of the spectrum is minimum. In practice, a source of information and its reliability may be guaranteed through a digital signature and/or insertion of a time-stamping thereof into the information exchanged with the other devices.

In the case of the approach described herein, the base stations BS may not necessarily be macro base stations, but advantages are obtained also using the new picocell-type base stations concepts. A large number of low-cost spectrum scanners may be added to the already existing network configuration in order to be part of consumer electronic products, indicated in FIG. 1 with references SC1, SC2, . . . , and SC9.

A (probably considerable) portion of such consumer electronic devices, generally indicated with SC, is suitable to be represented by cellular phones and by household appliances with fixed power supply, such as, for example, set-top-box devices (which contain a converter/decoder unit therein), high fidelity (HiFi) systems, DSL routers, WiFi routers etc. Low manufacturing costs regarding spectrum passive sniffing devices may, for example, be obtained—for such purpose— by way of transceivers based on the Ultra Wide Band (UWB) principle. Regarding this, reference may be made to U.S. Patent Application Publication No. 2007/053410 to Mahonen et al., assigned to the present application's assignee, which discloses an integrated circuit (chipset) based on an UWB method. Should such devices have a limited spectrum scanning capacity, addition of further bandwidth may be made at marginal costs.

The precision obtainable through this type of approach (which also allows maintaining costs low) is lower when compared to the case wherein devices BS1 and BS2 as described previously are used for distributed spectrum monitoring. Furthermore, a given amount of false information should be taken into account given that the source of information is not entirely under the control of known and trusted entities. Consumer electronic products (SC) may be made with various chipset receivers and various implementations including antennas, with the service quality depending on the dimensions, power budget, and the cost of the host devices.

Embodiments, which are particularly effective in terms of costs and have relatively high precision, are possible in case host devices are already in turn devices connected in a network and which comprise the capacity to communicate via radio therein. In the approach described herein, the use of the spectrum is thus monitored in a distributed manner by way of a first set of monitoring apparatuses (in the embodiment considered herein: BS1, BS2, SM1) and a second set of monitoring apparatuses (in the embodiment considered herein: SC1 to SC9), with the first set of monitoring apparatuses having a higher monitoring precision level with respect to the monitoring precision level of the monitoring apparatuses of the second set. In other embodiments, each of the first and the second set of monitoring apparatuses may each comprise from 1 to any number of monitoring apparatus.

In an embodiment, the detection of the spectrum is distributed not only in the space domain but also in the time domain. This means that, in the case of the base stations BS, it is possible to sense the spectrum with a high sampling frequency, given that there are no restrictions related to the power of the battery. The consumer electronic products SC may sense the spectrum with a lower and variable sampling frequency, without this having an impact on the total quality of the spectrum sensing due to the large number of devices available in the territory (territorial domain).

In another embodiment, the approach disclosed allows controlling the sampling frequency according to the situation. For example, when consumer electronic products SC detect base stations BS nearby, they may reduce their sampling frequency given that a higher sampling frequency would not offer particular advantages for the system as a whole. The decision to adjust the sampling frequency may be taken through a procedure, for example based on a Bayes estimator, which by commanding a closed-loop control circuit tries to provide information sufficiently precise to optimize the spectrum.

The spectrum management servers, indicated in the figures with SS1 and SS2, or similar devices, gather information coming from various spectrum passive sniffing devices shown in the figures. The spectrum management server performs data fusion starting from all the information provided by the other devices present in the network, to generate spectrum availability maps, for example, in a grid format (reference to this format is purely for exemplary and non-limiting purposes). In another embodiment, the data collection architecture is generally hierarchical.

In another embodiment, all devices capable of carrying out measurements, i.e. consumer electronic products SC and the base stations BS, may directly send information to the respective spectrum management servers SS. In an embodiment, construction of hierarchical structures may be provided for in order to optimize operation. In this case, for example, consumer electronic products SC may refer their information to the base stations BS or to other more suitable consumer electronic products SC, which in turn pass to the spectrum management servers SS such information unvaried or after pre-processing. Such "pre-processing" may, for example, comprise in partial data fusion, verification of the information consistency and/or entering comments regarding the reliability of forwarded data.

Likewise, management servers SS may form hierarchical and cooperation networks for exchanging data in order to gather sufficient information at the global level for production of spectrum availability maps and exhaustive models. One of the advantages of this approach is that the devices that operate in an intermittent manner (for example, the base station BS for the consumer electronic products SC first, then the spectrum management servers SS) have the authorization and are capable of obtaining data processing and reliability assessment regarding the information managed. The hierarchical architecture also allows the correct operation of the system in the absence of spectrum management servers SS.

The system may be managed with spectrum management servers, or in an entirely distributed manner wherein any combination of base stations BS and consumer electronic products SC cooperate with each other to exchange information regarding the spectrum. It may be appreciated that this approach does not amount to pure and simple "cooperative detection" of the conventional type in that several sensor classes and precision thereof are considered in this case. The task of controlling the reliability of the various sources and combining the results of the measurements may be performed by a node nearby having sufficient processing power to manage these tasks. Data regarding the detected spectrum may use a hierarchical validation and reliability model to produce confidence limits for data precision and reliability.

In an embodiment, the spectrum management server(s), or intermittent devices, may use stochastic and/or statistic procedures, such as—as a non-limiting example—Bayesian networks, to generate spectrum availability maps and models considering precision and reliability differences in local measurements carried out by various data sources.

With reference to FIG. 1, the architecture of the system comprises base stations BS1 and BS2 of a mobile communication network (generally belonging to a respective operator), spectrum monitors indicated with SM1, a set of, for example, two spectrum management servers SS1 and SS2 and a plurality of spectrum scanners, indicated with SCn. A set of spectrum scanners devices (SC5 to SC8, in the illustrated example) is indicated in its entirety with reference 10. In the figure, the lines that join the various entities to each other indicate the presence of cabled or wireless communication channels.

Figure 2:
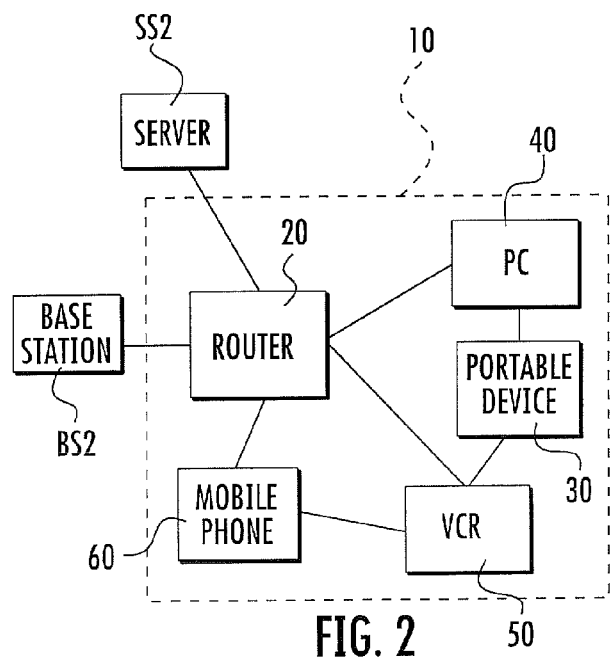
FIG. 2 represents a possible embodiment of a portion of FIG. 1.

FIG. 2 illustrates in more detail the set 10 that is part of the architecture of FIG. 1. In the example considered herein, reference 20 indicates a WiFi or DSL Router, reference 30 indicates a palmtop or PDA device, reference 40 indicates a computer or desktop PC, reference 50 indicates a Digital VCR, and reference 60 indicates a mobile phone. The router 20 communicates directly with the base station BS2 and with the spectrum management servers SS2. Furthermore, the router 20 is directly or indirectly in communication with the other devices that form the set 10. In particular, it communicates indirectly with the PDA 30 or through the PC 40 or through the videocassette recorder 50.

Figure 3:
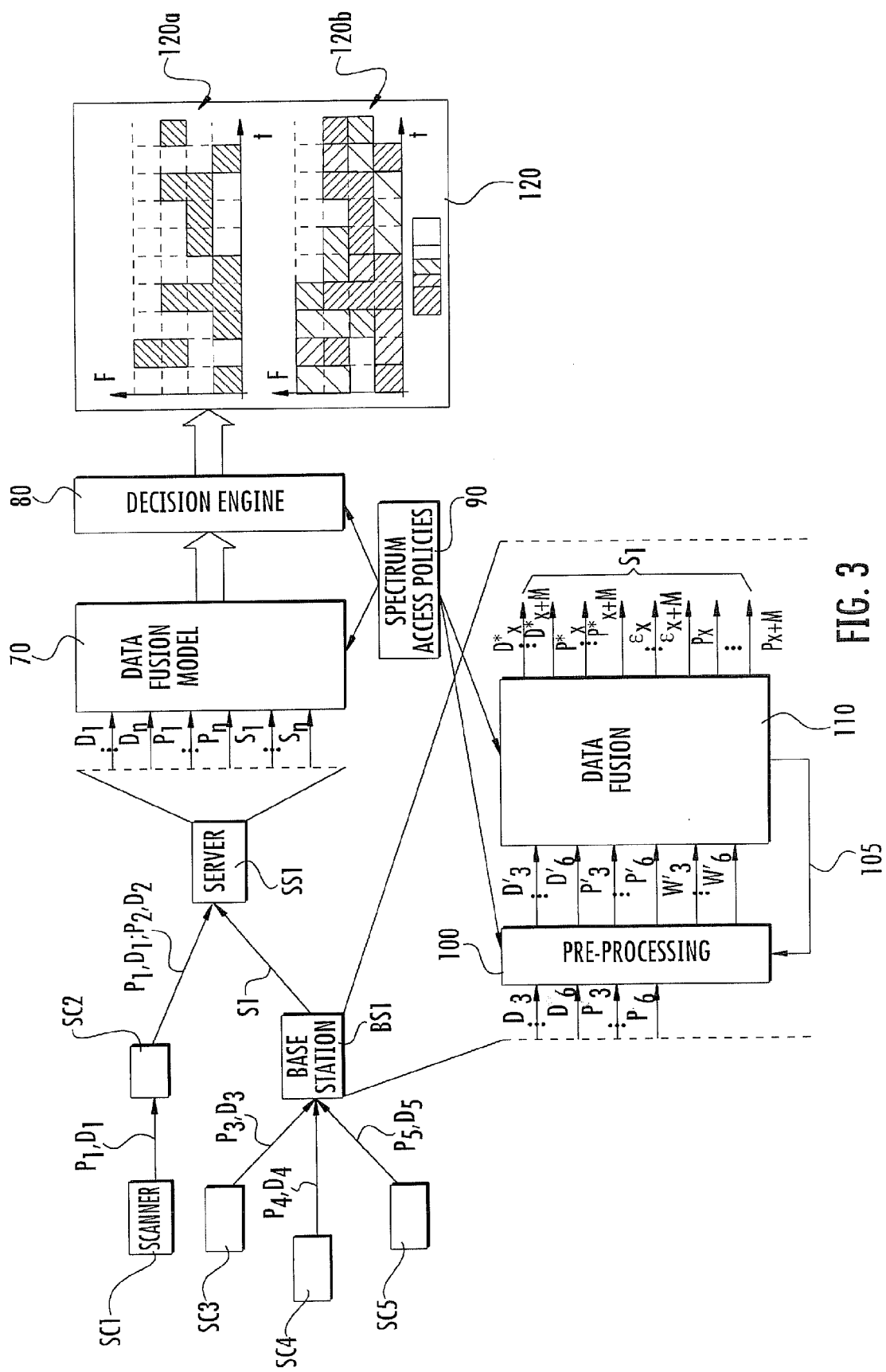
FIG. 3 shows a hierarchical detection of the spectrum which uses hierarchical spectrum scanners, according to the present invention.

FIG. 3 illustrates in more detail how the pre-processing and data fusion operations are performed in the system described herein. Each device SCi present in the spectrum detection network constantly performs, for example, local detection operations using given configurations. Its capacity, and hence the quality of its measurement results, may be described using a series of properties (confidence level, hardware precision, sampling frequency, position, etc.). Each complete set of measured data $D_i$ is forwarded to the spectrum detection hierarchical structure alongside the corresponding set of properties $p_i$.

One or more devices in the network, for example, the base station BS1 of FIG. 3, have greater processing power and may perform some pre-processing operations 100 on such gathered data $D_i$, for example, generating relative weights $w_i$. For example, the higher the weight generated, the better the measurement set processed. These steps are thus used in a data fusion step 110, wherein the available data is combined and a combined data set S1 is generated. Per se, a single combined set S1 would not be sufficient given that the position/type/time variables may be taken into account. In addition, data fusion 110 provides error estimates (indicated with $\epsilon_x$) and reliability measurements (indicated with $\rho_x$) for the new fused data set S1. All this information is forwarded in the network hierarchical structure. A feedback loop 105, which starts from the data fusion step 110 and returns back towards the pre-processing step 100 may improve the weight calculation $w_i$ over time.

The information reaches a spectrum management server SS, which can be capable of pre-processing and fusing data, or alternatively there may be an external pre-processing and data fusion module 70. Furthermore, the device SS may also have—inside or outside—a decision engine 80 that decides which frequency channels are available and which are occupied. This information is then represented in a spectrum map 120. Depending on the application, the map 120 may be binary 120a, wherein each time-frequency block indicates whether the channel is vacant or occupied, or whether weighted 120b. For each time-frequency block, the probability that such block may be vacant/occupied is provided. In the figure, the white blocks indicate a high probability that the channel be vacant, and as the blocks progressively darken, the probability reduces commensurately.

During the entire process (pre-processing 70/100, data fusion 70/110 and decisional process 80), spectrum access policies 90 and the respective regulations are taken into account. A simple example could be represented by the fact that the spectrum detection data is sufficiently up-to-date to allow the system to meet the desired performance standards in case the main user returns, and the secondary network may cease using its frequency band within a maximum period of time.

The validity of the spectrum map 120 (in terms of where and for how much time it is valid) once again depends on the policies or spectrum access policies 90 (maximum transmitted power etc.), but also generally on the frequency (propagation, etc.). Such information could be added to the spectrum map 120 when it is spread in the secondary network. Basically, the data fusion step is an operation that combines the results $D_i$ of the gathered measurements of the various devices that participate in the cooperation network. This data fusion considers the reliability of all the devices expressed by the respective weights $w_i$. These weights may be extracted from the metadata measurements $p_i$ or from previously performed or referred measurements.

In a simple case, the gathered results may be combined using a weighted average as follows:

$$D_{n+1}^* = \frac{1}{\sum_{i=1}^{N} w_i} \sum_{i=1}^{N} w_i D_i,$$

where the weights may be, for example, selected initially based on the measurement variance indicated by each source:

$$w_i = \frac{1}{\sigma_i^2}.$$

The variance of the weighted measurements may be used as a reliability estimate of the data fusion result:

$$\rho_{n+1}^* = \frac{1}{\sum_{i=1}^{N} w_i} \sum_{i=1}^{N} w_i (D_i - D_{n+1}^*)^2.$$

If the variance of the values indicated by all the data sources is known, reliability may be directly calculated as:

$$\rho_{n+1}^* = \sigma_{n+1}^{2*} = \frac{1}{\sum_{i=1}^{N} \frac{1}{\sigma_i^2}}.$$

The system uses constant weights, which do not vary over time. The seriousness and reliability of the various data sources are predefined and do not vary over the entire time of operation of the system. The weights can also be adapted over time according to local analysis and comparison of data gathered from various nodes or devices that form the system.

If the measurements indicated by a single station j are considerably different from the results indicated by other stations (i.e., $|D_j - D_{n+1}^*| \gg 0$) the weight $w_j$ may be suitably adapted. Such dynamic adaptations may also be used, for example, for implementing security functions. For example, a "malicious" node purposely sending erroneous measurements may be detected, and the impact thereof is reduced by reducing the corresponding weights associated thereto.

Furthermore, such weight adaptations may be activated through other methods, for example, if a node provides a valid certificate, its state is changed into a trusted node and its weight is increased. These aspects are described by the series of parameters $p_i$ illustrated in FIG. 2. In addition, procedures that exploit feedback structures to improve the weights over time are applicable. For example, a Kalman filter may be applied to obtain a time-variant data fusion.

Figure 4:
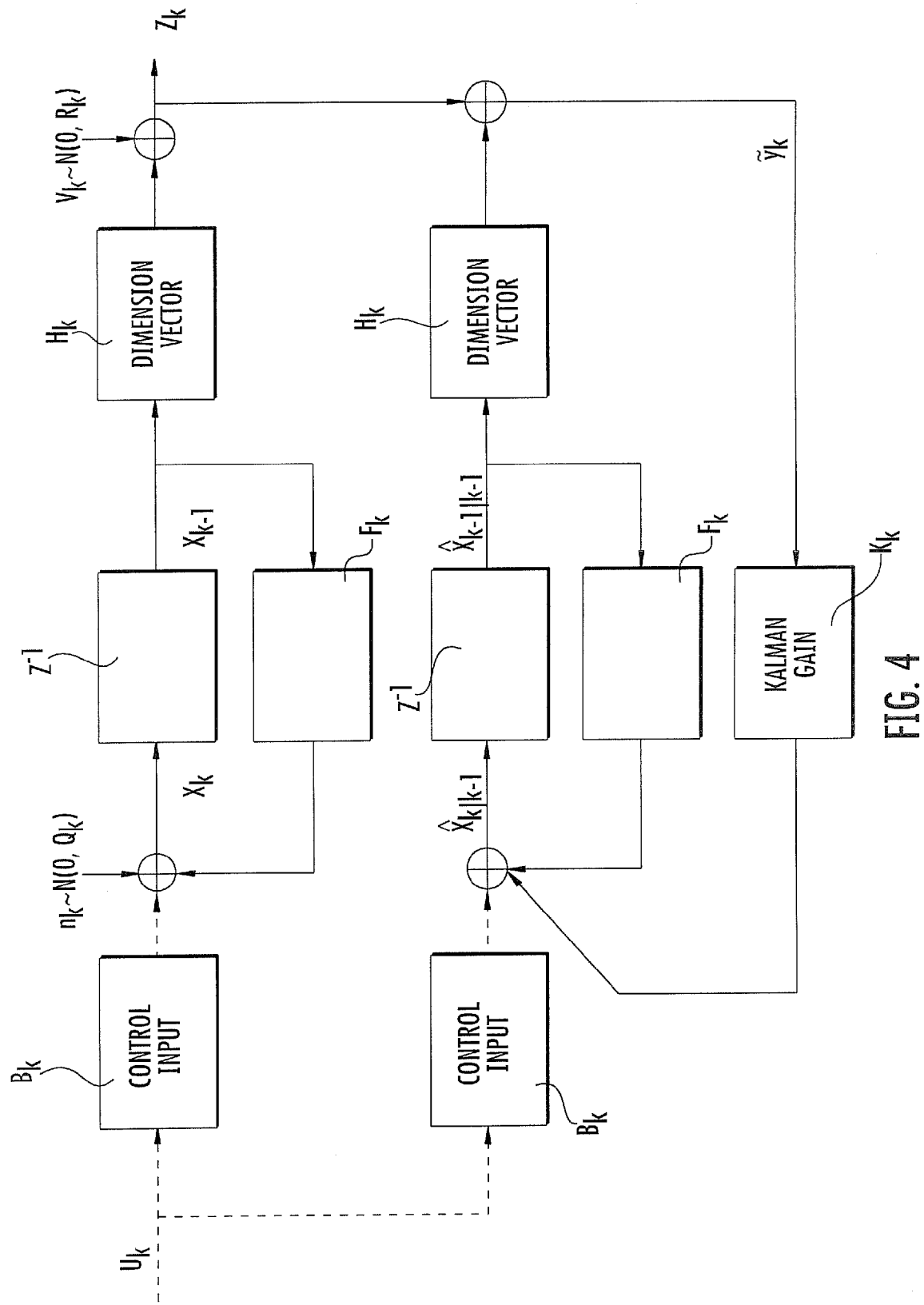
FIG. 4 represents a flow chart for making a Kalman filter, according to the present invention.

Provided hereinafter is a model regarding the abovementioned problem based on the common nomenclature typically used in the context of the Kalman filter theory. The flow chart regarding a Kalman filter is shown in FIG. 4. Such filter is well known in the art, hence providing a detailed description herein is superfluous.

The state variable $x_k$ currently indicated by the time index k represents the use of the spectrum of a given channel frequency. In case of energy detection, this corresponds to the power spectral density measured at a given frequency f and at a given bandwidth $\Delta f$:

$$x_k = [PSD_{k,f,\Delta f}].$$

As another example, in case of detection of the characteristics, this corresponds to the "solidness" of a given characteristic. In the previously described system $x_k$ it corresponds to D. The variation of the use of the spectrum over time follows a known process, which is modeled as a Gaussian random noise $n_k \sim N(0, Q_k)$. Given that the state variable is a one-dimensional vector, the covariance matrix of the noise process is $Q_k = [\sigma_n^2]$.

In the scheme considered herein, the use of the spectrum is not a controllable quantity, thus the control input $B_k$ and the control vector $u_k$ are equivalent to zero and not taken into account hereinafter. The base equation of the system state variation is:

$$x_k = F_k x_{k-1} + n_k,$$

$$F_k = 1.$$

The observation vector is:

$$z_k = H_k x_k + v_k,$$

where $$H_k = \begin{pmatrix} 1 \\ \vdots \\ 1 \end{pmatrix}$$

is a dimension vector (N×1), $$v_k \sim N(0, R_k),$$

and $$R_k = \begin{pmatrix} \sigma_{v1}^2 & 0 & \cdots & 0 \\ 0 & \sigma_{v2}^2 & \ddots & \vdots \\ \vdots & \ddots & \ddots & 0 \\ 0 & \cdots & 0 & \sigma_{vN}^2 \end{pmatrix}$$

is a matrix (N×N).

In this context, even the noise detected by each single sensor is modeled as a zero-mean Gaussian random noise. According to the description of the system above, the equations describing the two main Kalman filter steps may be obtained.

1) Prediction Step:
Predicted state: $\hat{x}_{k|k-1} = F_k \hat{x}_{k-1|k-1}$
Predicted estimate covariance: $P_{k|k-1} = F_k P_{k-1|k-1} F_k^T + Q_{k-1}$
2) Update Step:
Residual innovation or measurement: $\tilde{y}_k = z_k - H_k \hat{x}_{k|k-1}$
Residual innovation covariance: $S_k = H_k P_{k-1|k-1} H_k^T + R_k$
Optimal Kalman gain: $K_k = P_{k|k-1} H_k^T S_k^{-1}$
Update state estimate: $\hat{x}_{k|k} = \hat{x}_{k|k-1} + K_k \tilde{y}_k$
Update estimate covariance: $P_{k|k} = (I - K_k H_k) P_{k|k-1}$ Getting back to the initial situation, it is observable that the Kalman gain acquires the role of the time-variant weight $w_{i,k}$ and the updated state estimate corresponding to the result obtained from the fusion $D_{n+1}^*$. $K_k$ depends on $R_k$, and thus it takes the precision of the performed measurements into account.

In the previous formulation based on the Kalman filter both noise processes, i.e. the variation in the use of the spectrum and the observation of the errors that occur in all participating sensors are modeled as Gaussian random variables. Furthermore, the complete formulation is linear. If both hypotheses are met in the actual system, the Kalman filter represents an optimal approach. Should one of these hypotheses not be met, reference may be made to other techniques such as, for example, the so-called support Vector Machines, Bayesian networks, or particle filters. Furthermore, these techniques may be more complex when applied to the data fusion operation, also being capable of managing non-Gaussian or non-linear systems. Further details on these techniques are found, for example, in: N. Cristianini and J. Shawe-Taylor, "An introduction to support Vector Machines: and other kernel-based learning methods," Cambridge University Press New York, N.Y., USA, 1999; F. V. Jensen, "Introduction to Bayesian Networks," Springer-Verlag New York, N.J., USA, 1996; and B. Ristic, S. Arulampalam, and N. Gordon, "Beyond the Kalman Filter: Particle Filters for Tracking Applications," Artech House Publishers, 2004.

Also, systems that combine information coming from different sources, for example, security data from certificates and information regarding the quality of the measurements extracted from the signal measurement samples, represent extensions of the formulation provided. The use of a hierarchical and distributed detection process allows dynamic access to the spectrum. The architecture also allows centralized operation as a limited and simplified case.

The use of consumer apparatuses (examples include, but are not limited to set-top boxes, cellular phones, and WLAN access points etc.) as an integral part of the detection structure makes the detection network very efficient and dense. The approach disclosed may also be applied to devices capable of detecting the spectrum even though the respective detection capacities are not presented explicitly.

A wireless network supporting characteristics defined by the IEEE 802.11k work group, "Radio Resource Measurement Enhancements", represents an example. As a matter of fact, each node or device participating in such network calculates the RSSI (Received Signal Strength Indicator) indicator, which measures the strength of the signal received through 1 MHz channels in the entire ISM (Industrial Scientific and Medical) band. This operation actually represents a step for distributed detection energy. The frames used between access points AP and the stations STA of a network based on 802.11 WLAN (Wireless Local Area Network) for exchange of such measurement data are provided for at standard level.

In an embodiment according to the description herein, the access point AP performs, as described previously, pre-processing and data fusion operations in order to generate a spectrum map for the ISM band. This map may be exploited, for example, for dynamic selection of channels or exclusion of radar channels, as specified for systems based on IEEE 802.11h.

In a simple scenario with predefined weights, these can be fixed according to the class of the device. For example, access points AP may be suitable to provide more precise results given that the installed measurement hardware is of greater quality and that the device is not powered by a battery.

The following is a list of various classes of devices with ascending weights: standard STA stations; STA stations having passed some association procedures; other access points AP providing their results through wireless or cabled distribution system; local access points AP themselves; and high quality optional measurement devices, such as, for example, specific sensors or spectrum scanners, which also support the IEEE 802.11k protocol but which provide further certified information proving their excellent measurement precision. This certification is subjected to proprietary methods and is not covered by IEEE 802.11k.

The system described may easily leave the channels with interference from other non-WLAN systems active in the surrounding area and select a channel more appropriate for the purpose. No prior knowledge of the non-WLAN systems is required, making this system also suitable for future use.

Figure 5:
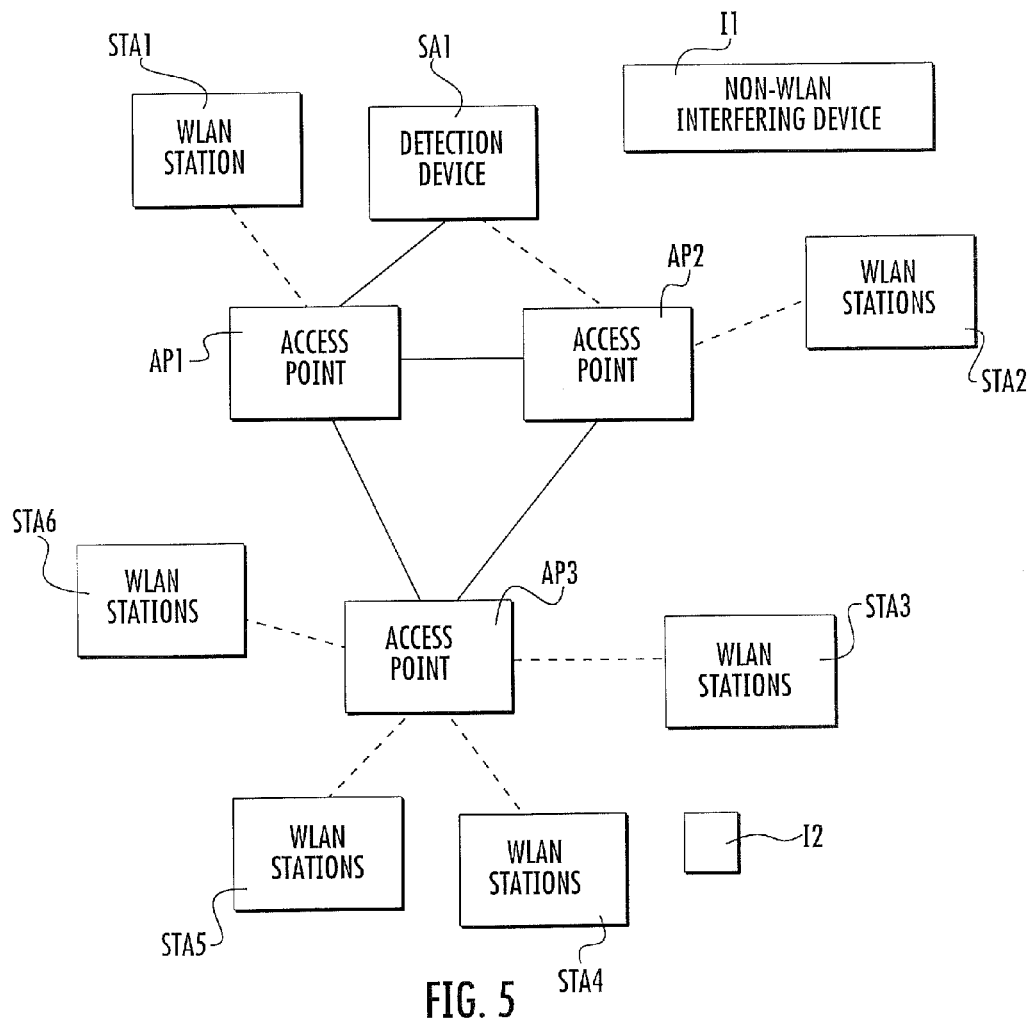
FIG. 5 represents another embodiment, according to the present invention.

FIG. 5 shows the described scenario. References AP indicate points of access to the local WLAN wireless network, references SA indicate specialized detection devices, for example, spectrum scanners, references STA indicate WLAN stations that support IEEE 802.11k, and references I indicate non-WLAN devices that create interference. The dotted lines indicate wireless connections between the access points AP and the stations STA. The full lines indicate cables or wireless communication channels implemented as part of the distribution system.

The signal emitted by $I_1$ may be strong enough to create interference in the channel between $AP_2$ and $STA_2$ but simultaneously too weak to be detected by any of these two devices. The $SA_1$, which is very sensitive, continues to detect such signal. Thus, its results are given a higher weight due to its high measurement precision. Therefore, $AP_2$ may pass to a channel without interference.

A similar situation is present in the lower half portion of the illustrated scenario. $AP_3$ combines the results of the measurements referred by stations $STA_3$ to $STA_6$ and avoids the channels on which $I_2$ interferes. Obviously, the details and embodiments may vary, even significantly, with respect to what has been described and illustrated, without departing from the scope of the disclosure as defined by the attached claims.

That which is claimed:

1. A method of monitoring spectrum usage in a cognitive radio system comprising:
   distributed monitoring of spectrum usage using at least one first monitoring apparatus and at least one second monitoring apparatus;
   the at least one first monitoring apparatus having a level of monitoring precision higher than a level of monitoring precision of said at least one second monitoring apparatus; and
   transferring information data on the spectrum usage collected by one of the at least one first and at least one second monitoring apparatuses to another one of the at least one first and at least one second monitoring apparatuses for pre-processing.

2. The method of claim 1 further comprising identifying the level of monitoring precision of the at least one first monitoring apparatus and the at least one second monitoring apparatus via at least one of an electronic signature and a time stamp.

3. The method of claim 1 wherein the at least one second monitoring apparatus comprises a spectrum sniffing electronic device.

4. The method of claim 1 wherein the at least one second monitoring apparatus comprises a spectrum sniffing Ultra Wide Band (UWB) transceiver.

5. The method of claim 1 further comprising distributed monitoring of the spectrum usage over space and time.

6. The method of claim 1 wherein when the at least one first monitoring apparatus comprises a plurality thereof, each first monitoring apparatus monitoring spectrum usage with a sampling frequency different than respective frequencies of other first monitoring apparatuses.

7. The method of claim 1 wherein the at least one second monitoring apparatus monitors spectrum usage with a variable sampling frequency.

8. The method of claim 1 wherein the at least one second monitoring apparatus comprises a plurality thereof; and wherein at least some the second monitoring apparatuses monitor spectrum usage with a sampling frequency based upon at least one of a charge level of a respective power supply and a proximity to the at least one first monitoring apparatus.

9. The method of claim 1 further comprising:
   collecting information data on spectrum usage from the at least one first and at least one second monitoring apparatuses; and
   processing the information data on the spectrum usage for data fusion by generating spectrum availability maps in grid form.

10. The method of claim 1 further comprising monitoring spectrum usage in a hierarchical scheme.

11. The method of claim 10 wherein the pre-processing comprises at least one of data fusion, consistency and reliability checking, and comment association to monitoring apparatuses.

12. The method of claim 1 further comprising monitoring spectrum usage in a hierarchical scheme by using validation and reliability models to produce confidence limits for data accuracy and reliability values.

13. The method of claim 1 further comprising monitoring spectrum usage by using stochastic and statistical models by generating spectrum availability maps and models based upon a level of accuracy and reliability of the at least one first and at least one second monitoring apparatuses.

14. A cognitive radio system comprising:
   at least one first monitoring apparatus; and
   at least one second monitoring apparatus cooperating therewith;
   said at least one first monitoring apparatus being configured to have a level of monitoring precision greater than a level of monitoring precision of said at least one second monitoring apparatus;
   said at least one first monitoring apparatus and said at least one second monitoring apparatus being configured to perform distributed monitoring of spectrum usage, and to transfer information data on the spectrum usage collected by one of said at least one first and at least one second monitoring apparatuses to another one of said at least one first and at least one second monitoring apparatuses for pre-processing.

15. The cognitive radio system of claim 14 wherein said at least one first monitoring apparatus and said at least one second monitoring apparatus are configured to identify a respective level of monitoring precision via at least one of an electronic signature and a time stamp.

16. The cognitive radio system of claim 14 wherein said at least one second monitoring apparatus comprises a spectrum sniffing electronic device.

17. The cognitive radio system of claim 14 wherein said at least one second monitoring apparatus comprises a spectrum sniffing Ultra Wide Band (UWB) device.

18. The cognitive radio system of claim 14 wherein said at least one first monitoring apparatus and said at least one second monitoring apparatus are configured to perform distributed monitoring of the spectrum usage over space and time.

19. The cognitive radio system of claim 14 wherein when said at least one first monitoring apparatus comprises a plurality thereof, each first monitoring apparatus monitoring spectrum usage with a sampling frequency different than respective frequencies of other first monitoring apparatuses.

20. The cognitive radio system of claim 14 wherein said at least one second monitoring apparatus is configured to monitor spectrum usage with a variable sampling frequency.

21. The cognitive radio system of claim 14 wherein said at least one second monitoring apparatus comprises a plurality thereof; and wherein at least some said second monitoring apparatuses monitor spectrum usage with a sampling frequency based upon at least one of a charge level of a respective power supply and a proximity to the at least one first monitoring apparatus.

22. The cognitive radio system of claim 14 further comprising a server cooperating with said at least one first monitoring apparatus and said at least one second monitoring apparatus and being configured to:
  collect information data on spectrum usage from said at least one first and at least one second monitoring apparatuses; and
  process the information data on the spectrum usage for data fusion by generating spectrum availability maps in grid form.

23. The cognitive radio system of claim 14 wherein said at least one first monitoring apparatus and said at least one second monitoring apparatus are configured to monitor spectrum usage in a hierarchical scheme.

24. The cognitive radio system of claim 23 wherein the pre-processing comprises at least one of data fusion, consistency and reliability checking, and comment association to monitoring apparatuses.

25. The cognitive radio system of claim 14 wherein said at least one first monitoring apparatus and said at least one second monitoring apparatus are configured to monitor spectrum usage in a hierarchical scheme by using validation and reliability models to produce confidence limits for data accuracy and reliability values.

26. The cognitive radio system of claim 14 wherein said at least one first monitoring apparatus and said at least one second monitoring apparatus are configured to monitor spectrum usage by using stochastic and statistical models by generating spectrum availability maps and models based upon a level of accuracy and reliability of the at least one first and at least one second monitoring apparatuses.

27. The cognitive radio system of claim 14 wherein said at least one first monitoring apparatus and said at least one second monitoring apparatus are configured as nodes in a network.

28. A cognitive radio system comprising:
  a plurality of different monitoring apparatuses communicating with each other;
  at least one of said plurality of different monitoring apparatuses being configured to have a level of monitoring precision greater than a level of monitoring precision of other monitoring apparatuses;
  said plurality of different monitoring apparatuses being configured to perform distributed monitoring of spectrum usage using data provided from each of said plurality of different monitoring apparatuses based upon a device type a respective different monitoring apparatus providing the data, a sampling frequency of the respective different monitoring apparatus, and a hierarchical ranking of the respective different monitoring apparatus;
  said at least one of said plurality of different monitoring apparatuses being configured to transfer information data on the spectrum usage collected by said at least one of said plurality of different monitoring apparatuses to the other monitoring apparatuses for pre-processing.

29. The cognitive radio system of claim 28 wherein said plurality of different monitoring apparatuses is configured to identify a respective level of monitoring precision via at least one of an electronic signature and a time stamp.

30. The cognitive radio system of claim 28 wherein said plurality of different monitoring apparatuses comprises a spectrum sniffing electronic device.

31. The cognitive radio system of claim 28 wherein said plurality of different monitoring apparatuses comprises a spectrum sniffing Ultra Wide Band (UWB) device.

32. A non-transitory computer-readable medium comprising software code portions for performing a method for monitoring spectrum usage in a cognitive radio system, the method comprising:
  distributed monitoring of spectrum usage using at least one first monitoring apparatus and at least one second monitoring apparatus;
  the at least one first monitoring apparatus having a level of monitoring precision higher than a level of monitoring precision of said at least one second monitoring apparatus; and
  transferring information data on the spectrum usage collected by one of the at least one first and at least one second monitoring apparatuses to another one of the at least one first and at least one second monitoring apparatuses for pre-processing.

33. The non-transitory computer-readable medium of claim 32 wherein the method further comprises identifying the level of monitoring precision of the at least one first monitoring apparatus and the at least one second monitoring apparatus via at least one of an electronic signature and a time stamp.

34. The non-transitory computer-readable medium of claim 32 wherein the at least one second monitoring apparatus comprises a spectrum sniffing consumer electronic device.

35. The non-transitory computer-readable medium of claim 32 wherein the at least one second monitoring apparatus comprises a spectrum sniffing Ultra Wide Band (UWB) device.

36. The non-transitory computer-readable medium of claim 32 wherein the method further comprises distributed monitoring of the spectrum usage over space and time.

37. The non-transitory computer-readable medium of claim 32 wherein when the at least one first monitoring apparatus comprises a plurality thereof, each first monitoring apparatus monitoring spectrum usage with a sampling frequency different than respective frequencies of other first monitoring apparatuses.

38. The non-transitory computer-readable medium of claim 32 wherein the at least one second monitoring apparatus monitors spectrum usage with a variable sampling frequency.

* * * * *